Patented Mar. 13, 1951

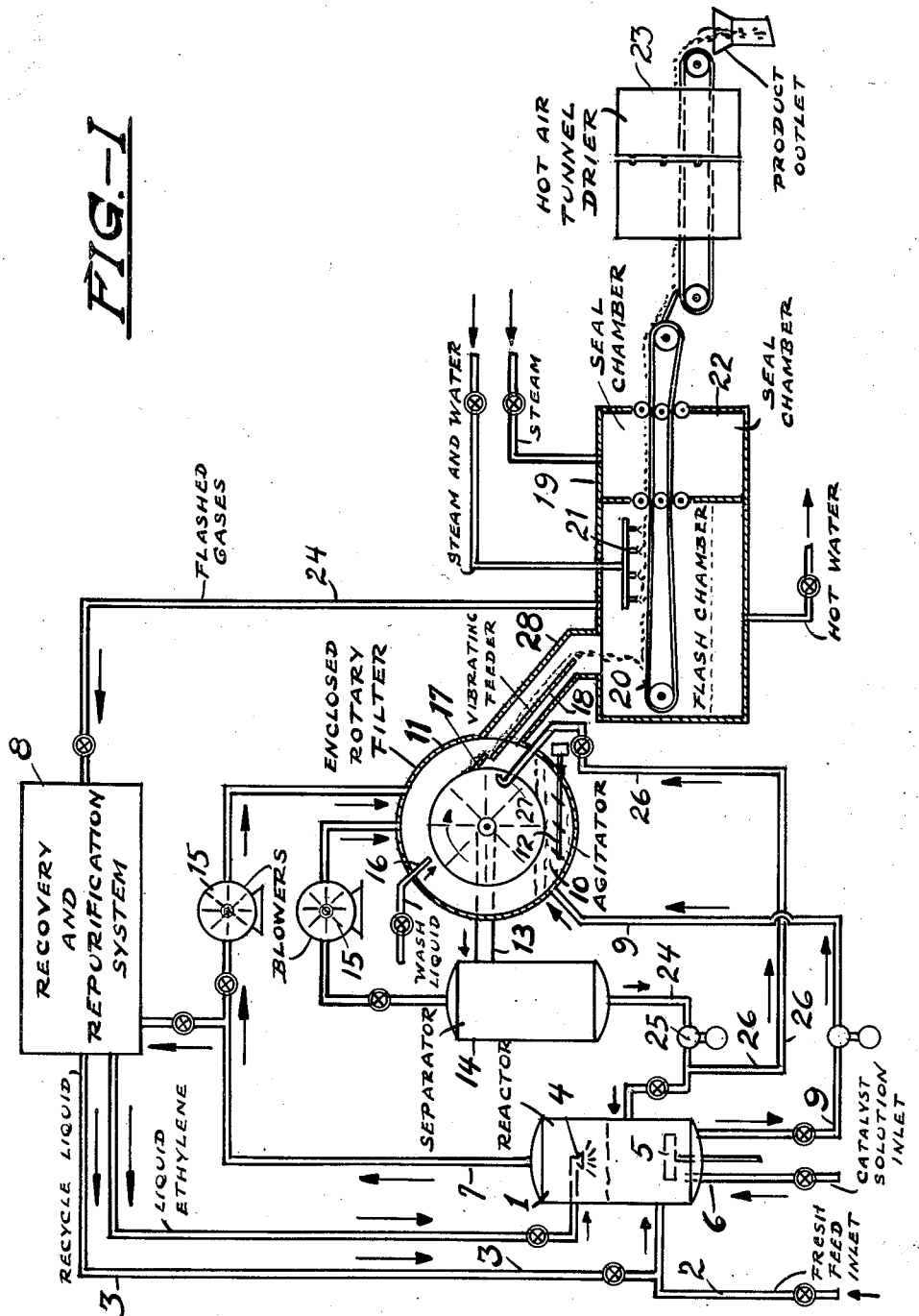

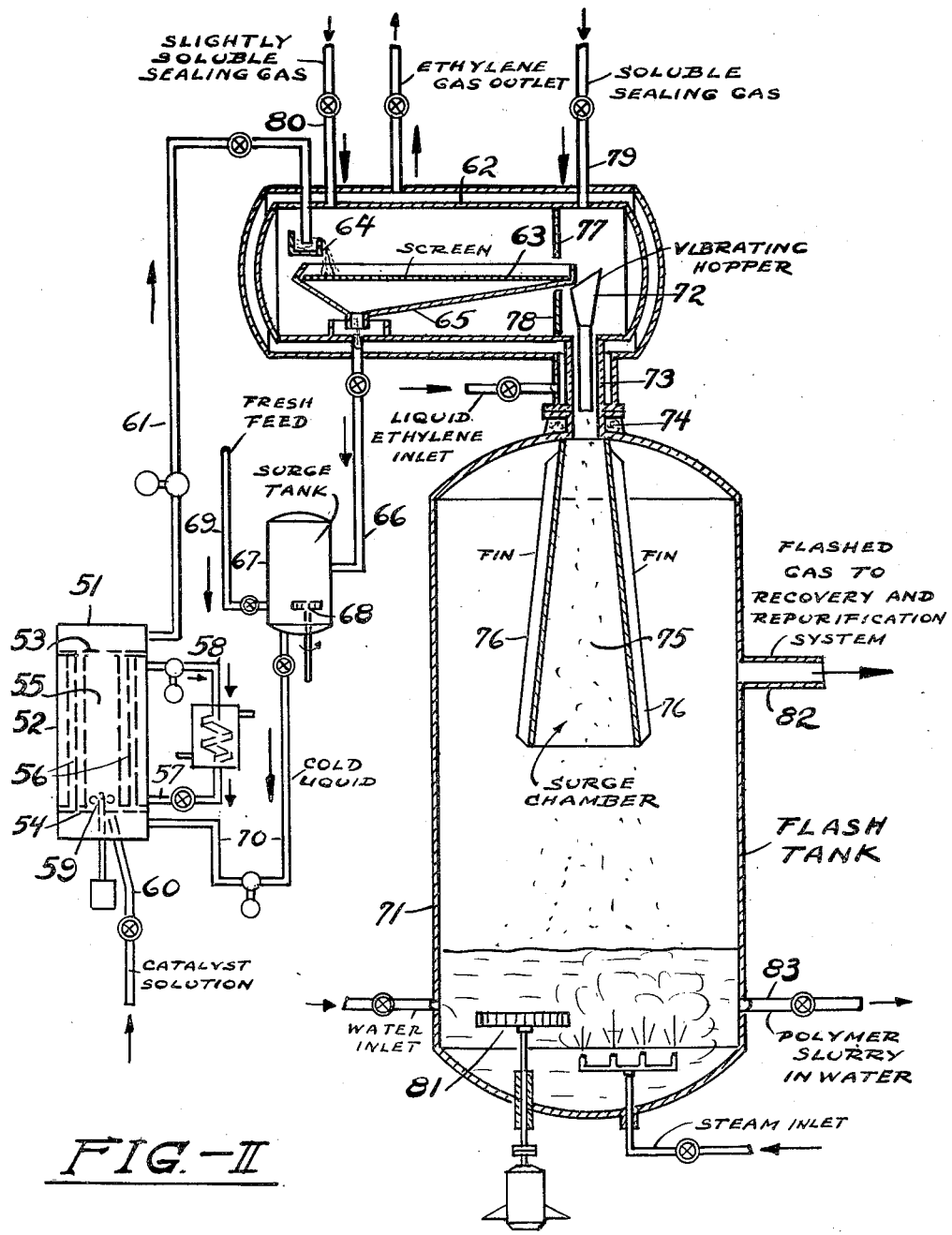

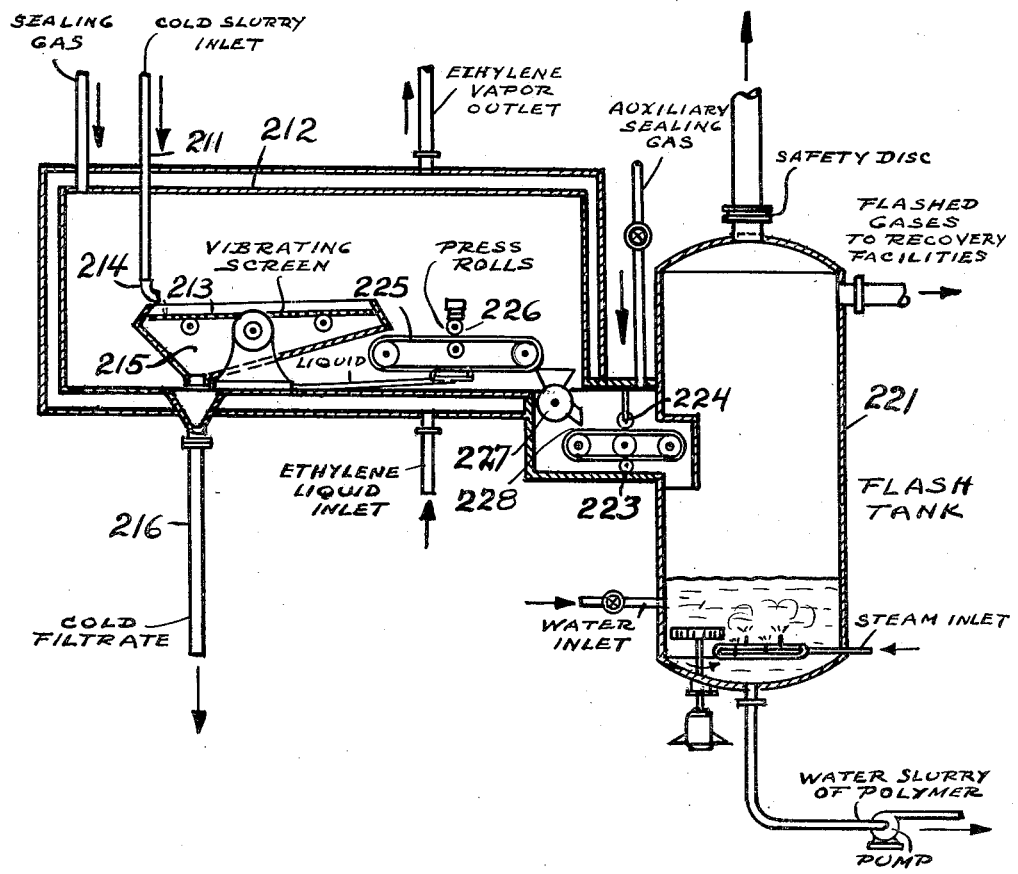
FIG.-III

2,545,144

UNITED STATES PATENT OFFICE 2,545,144

PROCESS AND APPARATUS FOR THE PRODUCTION OF HIGH MOLECULAR WEIGHT POLYMERS

Arthur D. Green, Cranford, and Walter J. Paltz, Fanwood, N. J., assignors to Standard Oil Development Company, a corporation of Delaware Application April 21, 1943, Serial No. 483,882

2 Claims. (Cl. 260—85.3)

This invention relates to polymerization processes and apparatus and particularly to processes and apparatus for the low temperature polymerization of isoolefins or mixtures of isoolefins and diolefins.

It is the object of this invention to provide the art with a method and apparatus whereby low temperature polymerization of isoolefins or of mixtures of isoolefins and diolefins may be conducted in a continuous and highly efficient manner.

It is a further object of this invention to provide the art with a method and apparatus whereby high molecular polymerizates obtained by the polymerization of an isoolefin or by the copolymerization of a mixture of an isoolefin and a diolefin at low temperatures in the presence of Friedel-Crafts type catalysts may be produced easily, with much smaller equipment and of more uniform properties.

These and other objects will appear more clearly from the detailed description and claims which follow.

It has been known for some time, as may be seen from U. S. Patent No. 2,203,873, dated June 11, 1940, that high molecular weight polymers, i. e., having a molecular weight (by the Staudinger method) of from 15,000 to 25,000 up to 200,000 to 300,000 or more, are obtained if isoolefins, such as isobutylene, are contacted with Friedel-Crafts type catalysts such as aluminum chloride and the like at temperatures below $-10°$ C. More recently it was found, as may be seen from Australian Patent No. 112,875, issued July 31, 1941, that a copolymer which is curable with sulfur is obtained if mixtures of an isoolefin such as isobutylene with a conjugated diolefin such as butadiene or isoprene are treated with a solution of a Friedel-Crafts type catalyst in a non-complex forming, low-freezing solvent such as methyl or ethyl chloride and at temperatures ranging from $-10°$ C. to $-160°$ C., preferably at temperatures of between $-40°$ C. and $-103°$ C. These polymerizations have been conducted in the presence of an internal refrigerant such as liquefied ethylene, in which case the heat of reaction is removed directly by evaporation of part of the ethylene without the necessity for transferring heat through the surfaces of the reaction vessel or through cooling coils arranged in the reaction vessels. On the other hand, there are certain definite advantages to be gained in conducting the reaction in the presence of other diluents which have a higher boiling point than ethylene and are incapable of serving as internal refrigerants, in which case it is necessary to provide some other cooling agent and to remove the heat of reaction by indirect cooling using heat exchanger surfaces. The advantages of the indirect cooling method are, firstly, that it is possible thereby to keep the refrigerant uncontaminated with other materials, thus eliminating the necessity for repurifying the refrigerant and, secondly, that it permits a greater choice of materials for use as diluent in the reaction and, particularly, it permits the utilization of isobutylene itself as the principal diluent.

The reaction was originally carried out batchwise and the polymer was removed as large lumps or masses. It became apparent that the handling of such masses of polymer would involve a number of serious disadvantages when this reaction was attempted on a larger scale. For example, in order adequately to wash out the residual catalyst and to remove completely the traces of volatile materials, it was necessary to wash and steam the polymerizates in heavy masticating apparatus such as kneaders, mills or Banbury mixers. Furthermore, on a large scale, there would be considerable difficulty and danger in transferring masses of polymer which still contained volatile, inflammable material from one vessel to another.

It was subsequently found that the reaction could be carried out in such a way as to keep the solid polymerizate particles in a finely divided condition suspended in the cold reaction mixture so that a slurry of solid polymer in the cold reaction mixture is obtained which could be handled at low temperature in pumps and pipes and which could be dropped into well-agitated warm water or other liquid, whereby the volatile materials could be effectively removed as vapors, leaving the polymer in the water as a finely divided slurry. Advantages that are gained by obtaining the polymer in the latter form include greater ease of handling, since the slurry can be readily pumped; convenient separation of the polymer from the inflammable vapors; and, furthermore, it permits of more effective washing and degassing of the polymer in simple equipment without the need for heavy masticating machinery. Furthermore, the polymer can be separated from the resultant water slurry by standard filtering equipment and the wet polymer dried in a standard type hot air tunnel drier. The dried polymer is, in general, suitable for use directly, although in most cases where the product must be shipped, it is desirable to mill or extrude the product to increase bulk density and to facilitate packaging.

This process, moreover, can be made entirely continuous from start to finish, resulting in substantial savings in equipment and labor.

It has been found that the reaction may be conducted in such a way as to produce a finely divided slurry of polymer either using ethylene as a direct refrigerant-diluent or using other diluents with indirect refrigeration. There are certain conditions, however, under which a slurry is not readily formed and, of course, such conditions must be carefully avoided and special measures must be taken in order to conduct the process successfully. Agglomeration of the polymer and destruction of the slurry is favored by higher temperatures, lower molecular weight of the polymer, the use of a diluent which tends to be mutually soluble with the polymer under the operating conditions, and insufficient degree of dispersion of the catalyst.

Stable slurries of polybutenes can be produced at $-130°$ F. (external refrigeration) with methyl-chloride-isobutylene feeds by maintaining a volume ratio of methyl chloride to isobutylene over about 0.7:1 in the reaction mixture, with good agitation throughout the slurry (Reynolds numbers over about 5,000–6,000 and preferably over 10,000). At higher temperatures, higher diluent ratios are required, and above about $-60°$ F. a slurry cannot be formed in any case, as the molecular weight of the polymer is much lowered by the increase in reaction temperature level. This temperature effect on molecular weight has been described by Thomas, Sparks, Frolich, Otto and Müller Cunradi in the Journal of American Chemical Society, vol. 62, p. 276 (1940). As is also indicated in that article, impurities in the reaction mixture tend to lower the molecular weight, and the lower molecular weight the higher the diluent ratio required to form a satisfactory slurry. Ordinarily, those conditions which lead to the formation of polybutenes of medium or high molecular weight, i. e., of 80,000 and higher, yield the polymer in the form of a stable, filterable slurry.

The same general principles apply to low temperature iso-olefin-diolefin synthetic rubber slurries. The "molecular weights," as determined by the Staudinger method, of low temperature iso-olefin-diolefin synthetic rubber are considerably lower than those of polybutene prepared under otherwise similar conditions, due to the presence of diolefin. At $-130°$ F., diluent ratios above 1:1 in the reaction zone should obtain, and preferably over 2:1. In any event, in the manufacture of these copolymers the reaction temperature should not exceed about $-90°$ F. When using aluminum chloride-methyl chloride catalyst solutions, the concentration of aluminum chloride should preferably be not over about 1 gram per 100 cc. For example, in making rubber-like copolymers at $-130°$ F. from isobutylene and isoprene using no other diluent, except the small amount of methyl chloride added in the catalyst solution, it has been found that a slurry is not formed even at that low temperature due to the mutual solubility of the isobutylene and the polymer which renders the polymer tacky. Low temperature isoolefin-diolefin copolymers of normal molecular weight, i. e., having a Staudinger molecular weight of about 30,000 and above can easily be maintained as a slurry provided that the percent hydrocarbon or other mutual solvent is not too high. Thus, when the reaction liquid contains 60 to 90 weight per cent of methyl chloride, the slurries containing polymer averaging over roughly 30,000 molecular weight are quite stable, but if the percentage of methyl chloride is reduced to about 30% the slurry becomes unstable and the polymer particles tend to agglomerate.

When preparing slurries of polymer in the presence of ethylene as internal refrigerant, good slurries are formed when reacting isobutylene or isobutylene diolefin feeds in the presence of 2 or more volumes ethylene per volume of hydrocarbon at temperatures below about $-135°$ C. (corresponding to the boiling point of the mixture under atmospheric pressure), using catalyst concentrations of 0.3–1.0 gms. aluminum chloride per 100 cc. of catalyst solution (in, say, methyl chloride), under conditions of good agitation.

It has also been found that stable slurries could be prepared using carbon dioxide as an internal refrigerant by polymerizing a low temperature iso-olefin-diolefin synthetic rubber feed containing 20 volume percent of dissolved $CO_2$ at about $-105°$ F., in the presence of 2 volumes of methyl chloride diluent per volume of $CO_2$-free hydrocarbon feed.

With increasing diolefin content of the low temperature iso-olefin-diolefin synthetic rubber feed, the molecular weight is lowered, and the temperature at which a slurry is stable is lowered. Increasing diluent ratio will also compensate, to a limited extent, for lower molecular weight of polymer, and permit slurry formation.

In order to operate as discussed above so that the polymer is maintained as a slurry, it is necessary also not to exceed a certain weight percent solids in the slurry, otherwise the equipment and pipes become plugged with agglomerated material. The effect is similar to that experienced with other types of slurries in that for every degree of agitation there is a maximum percent solids that can be maintained in suspension. In the case of the preparation of isoolefin-diolefin copolymers, it has been found that 10 to 15 weight percent of solids is the maximum desirable operating range, with about 20 weight percent of solids the maximum operable concentration. In general, the lower the weight percent solids, the easier it is to maintain the slurry.

In the process heretofore developed, the cold slurry from the reactor is piped directly to and dropped into a chamber containing hot water to flash off the volatile materials, i. e., unreacted olefinic materials and diluents. The materials thus volatilized had to be compressed, refractionated to control the impurities content, recooled to the reaction temperature of about $-130°$ F. and returned to the polymerization. Accordingly, for every pound of polymer produced about 5.7 to about 9 pounds of volatile materials had to be subjected to the foregoing recovery treatment. Since a major part of the cost of producing polymers in this way is in the fractionation and refrigeration equipment, it is quite apparent that this method of operation necessitates a substantially larger and therefore more costly fractionation and refrigeration system than would be necessary if the amount of recycle were not so large. In an effort to reduce the amount of recycle, the process has been conducted at high concentrations of solid polymer but this procedure has operating difficulties because of the plugging of pipes and the like, necessitating frequent shutting down of equipment for cleaning.

We have found a relatively simple way in which to operate this process and reduce the amount of recycle to the neighborhood of 1.2 to 2.5 pounds per pound of polymer produced. Since this amount of recycle is only about a fifth of the amount that had to be handled heretofore, this gives a major saving in fractionation and refrigeration equipment and consequently a large decrease in plant and operating costs. Moreover, by applying our invention to existing plants it is possible substantially to treble plant capacity with only a relatively small addition to the plant.

The present invention consists in conducting the polymerizing reaction under conditions conducive to the formation of a stable, filterable slurry, withdrawing the slurry of polymer in cold reaction liquid, separating the polymer from the bulk of the reaction liquid at temperatures low enough to prevent excessive tackiness and agglomeration of the polymer, and returning the cold reaction liquid to the reactor. The separated cold polymer containing a certain amount of reaction liquid adhering to it is dropped into heated, well-agitated water in order to volatilize the low boiling materials and to form a water slurry of relatively finely divided polymer. In this way, it is possible to retain all the advantages of the former process such as performing the polymerization in a slurry which can be readily handled and obtaining the polymer in finely divided condition to facilitate its washing, degassing and drying.

Our invention is applicable to the separation of any solid, high molecular low temperature polymerizates from isoolefinic materials alone or from mixtures of isoolefinic materials with a number of diolefinic materials capable of copolymerizing with isoolefins. The isoolefin that is preferred is isobutylene but other isoolefins containing up to about 8 carbon atoms per molecule may be used. The copolymerizable diolefinic materials include butadienes and substituted butadienes, especially isoprene, piperylene and dimethyl butadiene. Other polyolefinic materials containing up to 12 or 14 carbon atoms per molecule such as myrcene and certain non-conjugated diolefins, such as dimethylallene and the like, are also useful. The ratio of isoolefin to diolefin in the liquid is from about 50 to 95 weight percent of isoolefin to about 50 to 5 weight percent of diolefin when the latter is a $C_4$ diolefin. With $C_5$ and higher diolefins, the amount of diolefins is less than 10 weight percent and preferably less than 5 weight percent.

The olefinic materials are preferably cooled to temperatures below about $-40°$ C. and polymerized by the addition of a catalyst consisting of a Friedel-Crafts type catalyst dissolved in a low-freezing non-complex-forming solvent such as methyl-, ethyl- or propyl, mono- or polyhalides or carbon disulfide or sulfuryl chloride or the like. The reactants, catalysts, solvents and the like and the general properties of the polymers formed are described in the above-mentioned Müller Cunradi et al. U. S. Patent 2,203,873 and in the Australian Patent 112,875.

The separation of the solid polymer particles from the cold reaction liquid can be carried out in many ways although there are major mechanical problems introduced by the low temperature of operation and by the presence of highly volatile and inflammable materials. In its simplest and crudest form, the process might consist in effecting polymerization in a batch reactor which dumps into a batch, box-type filter. Such an operation would take a large number of small units with high labor consumption and would require frequent cleaning of the screen. Also, since the cold polymer becomes tacky in the range between the polymerization temperature and the boiling point of the adhering liquid, manual removal of the polymer would undoubtedly be accompanied by some agglomeration of the polymer which would render it extremely difficult, if not impossible, to obtain a water slurry of finely divided polymer.

It is highly desirable, therefore, to accomplish the separation of the solid polymer particles from the slurry in a continuous manner, keeping the equipment sealed against the atmosphere because of the inflammable, as well as valuable vapors, and separating the polymer particles from the cold reaction liquid and transferring the polymer particles to the subsequent operations without contacting them with air. The continuous separating or filtering equipment that can be used include enclosed rotary filters of pressure or vacuum type, simple endless belt type screens, enclosed vibrating screens, filter presses, rotary leaf filters, pressure rotary filters wherein the slurry is fed on the inside and the solid removed from the inside of the cylinder, rotating screens such as are used for classifying solids, etc. However, for successful continuous operation, it is desirable that the filter be provided with positive means of keeping the pores of the filter cloth sufficiently free from polymer, otherwise frequent shutdowns for cleaning of the filter cloth will be necessary.

Apparatus suitable for the conduct of the process in accordance with the present invention is illustrated in the accompanying drawing, wherein Figure 1 is a diagrammatic view of a continuous polymerization equipment according to this invention utilizing an internal refrigerant and an enclosed rotary filter.

Figure 2 is a diagrammatic view of the preferred embodiment using an externally refrigerated continuous reactor, a vibrating screen for the separation of the polymer from the liquid and special arrangement for transferring the separated polymer into the flash tank, wherein a water slurry of the polymer is obtained while causing vaporization of the residual adhering liquid hydrocarbons and diluent.

Figure 3 shows another arrangement utilizing a vibrating screen for separating the solid polymer particles from the bulk of the cold reaction mixture.

Referring to Figure 1, the apparatus comprises a continuous reactor 1 which operates on the direct refrigeration principle and which is fed with a precooled mixture of fresh feed (isobutylene and isoprene) through line 2 and recycle liquid (isobutylene, isoprene and ethylene) through line 3. Liquid ethylene is preferably introduced by means of the sprayer 4 in such a way as to wash the walls of the upper part of the reactor to keep them clear. The reactor operates at about $-135°$ F. at essentially atmospheric pressure. An agitator 5 is arranged near the bottom of the reactor. The catalyst solution (aluminum chloride dissolved in methyl chloride) is supplied to the reactor through line 6 and is sprayed in a fine stream into a zone of maximum turbulence near the agitator 5 in order to obtain satisfactory dispersion of the catalyst throughout the reaction mixture. The reaction is almost instantaneous, forming fine particles of polymer which remain suspended in the unreacted liquid materials. The heat of reaction causes vaporization of ethylene which flashes off and is withdrawn through line 7 and is returned to the recovery and repurification system 8. The reactants are supplied to the reactor in such amounts that there are present therein about 90 to 99.5% of isoolefin, preferably isobutylene and about 10 to 0.5% of isoprene. The internal refrigerant, preferably ethylene, is supplied to the reactor in such amounts that there are present about two to seven parts of ethylene per part of olefinic reactants. The catalyst solution is about a 0.1 to 1.0% solution of aluminum chloride in methyl chloride or ethyl chloride whereby there is introduced about 0.3 to 2 pounds of catalyst solvent per pound of polymer produced.

Cold slurry is withdrawn continuously from the reactor through line 9 and is pumped to the sump 10 of an enclosed rotary filter 11 which is operated at approximately the same temperature as the reactor. The filter can be of a more or less standard type except that it must be constructed of materials such as, 3% nickel steel or brass (60% copper) which will withstand the low temperatures of operation. The filter shown consists of the usual large diameter drum having filter cloth or screen on the periphery. The interior of the drum is divided into a number of segments which are connected through suitable valves to collecting pipes. The filtering drum dips into the sump 10 containing the slurry. An agitator 12 is arranged in the sump in order to keep the solid polymer particles in suspension. As the cylinder is revolved, the valve arrangement opens up the segments to a reservoir of lower pressure which serves to cause the passage of cold reaction liquid and gas, principally vaporized ethylene, through the screen into the segment and thence through pipe 13 into the separator 14. The pressure differential to cause the reaction liquid to flow into the segment and thence into separator 14 may be provided by means of a suitable vacuum pump or by blowing ethylene gas into the filter enclosure to increase the pressure on the surface of the slurry in the sump to cause other reaction liquid to flow into the segment and into the separator. The latter procedure is generally preferred whenever, as with ethylene, the boiling point of the liquid is anywhere near the actual filtering temperature, since in this way excessive flashing of the liquid is prevented.

The cold reaction liquid is withdrawn from the separator 14 through line 24 and is recirculated back to the reactor by pump 25, a part of this cold reaction liquid being supplied through line 26 to the blow-back 27 provided for cleansing the screen of the filter.

The ethylene or recycle gas is withdrawn from the separator and recycled into the filter enclosure by means of a blower 15. A sprayer 16 is provided in the casing for spraying washing liquid such as ethylene, cold methyl chloride or cold fresh feed upon the layer of polymer particles on the drum surface to wash off adhering reaction liquid, residual catalyst and the like. Gaseous ethylene that is recycled to the filter enclosure passes through the layer of polymer particles on the drum and serves further to remove reaction liquid and/or wash liquid from the polymer. As each segment is rotated, it finally reaches a knife or doctor blade 17 which serves to scrape or remove the polymer particles from the surface of the filtering drum, whereupon the polymer particles drop onto a vibrating feeder 18 which conducts the solid polymer particles into the flash chamber 19. Each segment, after leaving the knife 17 can be given a blowback with filtrate, as described above, or with ethylene, methyl chloride or the like in order to unplug the pores of the screen. The ethylene or other recycle gas supplied to the filter enclosure is provided in sufficient amount and at sufficient pressure to travel concurrently with the polymer through the conduit 28 which surrounds the vibrating feeder 18. Flow of cold gas from the filter enclosure through conduit 28 into the flash chamber 19 is necessary in order to prevent water vapor from backing up into the filter enclosure and icing the cold surfaces therein.

The cold polymer, containing a certain amount of adhering liquid is dropped into the flash chamber 19 which is similar to the apparatus shown in the copending application Serial No. 411,440, filed September 19, 1941, by A. D. Green, now Patent No. 2,334,298. This apparatus consists of an endless screen belt 20 onto which polymer particles are dropped. Steam and water are sprayed onto the polymer as the endless screen is moved past the jets 21 thereby washing and degassing the polymer. The screen with the washed and degassed polymer thereon is then passed through a seal chamber 22 into the atmosphere. Steam at a pressure above that prevailing in the flash chamber 19 is provided in seal chamber 22 in order to prevent the escape of flashed gases from chamber 19 into the atmosphere. The polymer is then dried in a hot air tunnel drier 23 or other suitable drying means.

The flashed gases, as well as the sealing gas supplied through conduit 28, are withdrawn from the flash chamber 19 through line 24 and sent to the recovery and repurification system 8. The latter comprises compressors, gas driers, columns for fractionating out catalyst solvent and scrubbers for purifying catalyst solvent, also fractionators for removing small quantity of a purge stream containing the impurities which were introduced with the feed or formed as byproducts.

A better and, in fact, the preferred method of conducting the process is shown in Figure II. In this figure, 51 is a continuous reactor of the type shown in copending application Serial No. 443,575, filed June 26, 1942, now abandoned, by John H. Bannon. The reactor comprises a shell or casing 52 provided with an upper header 53 and a lower header 54 between which there are positioned a relatively large diameter central shaft tube 55 and a plurality of smaller return tubes 56. The space between the headers and surrounding the draft tube and return tubes is supplied with a refrigerant such as ethylene through line 57. Ethylene which is vaporized by the absorption of the heat of reaction is removed through line 58, reliquefied by compression and cooling and returned to the reactor through line 57.

A motor driven agitator 59 is provided near the bottom of the draft tube 55 in order to produce circulation in the reactor. Catalyst solution, for example, aluminum chloride dissolved in methyl chloride, is supplied to the reactor through line 60 which discharges a fine jet of the catalyst solution in close proximity to the agitator in order that it may be effectively dispersed in the reaction mixture. Cold slurry, containing from about 1 to about 10% of solids, is withdrawn continuously from the reactor through line 61 and is pumped while still cold to an enclosed chamber 62 provided with a screen 63 of the vibrating type. While the screen is preferably of the vibrating type, having a circular motion in a vertical plane parallel to the screen axis, or of the electromagnetic type having a low amplitude straight line motion at some suitable angle with the screening surface, it may be any other kind which depends upon applied motion for conveying the solid across the screen and for decreasing the tendency of the polymer to stick to the openings of the screen. The pipe 61 discharges the cold slurry into a weir box 64 which distributes the slurry across the screen. The cold liquid passes through the screen 63 and is collected in trough 65 which discharges the cold liquid into line 66 and thence into the surge tank 67. A motor driven mixer or agitator 68 is preferably provided in the surge tank for keeping in suspension any fine particles of slurry which pass through the screen with the cold liquid. Fresh feed comprising isoolefin and diolefin and preferably also methyl chloride is supplied to the surge tank through line 69 and is thoroughly mixed with the recycled cold reaction liquid. The combined liquid is withdrawn from the surge tank and is pumped through line 70 into the reactor, a suitable indirect refrigerating unit being provided in this line if the temperature of the feed to the reactor is appreciably above the desired reaction temperature. Since the reaction as well as the filtering steps are conducted at temperatures far below ordinary room temperature, it is desirable to provide refrigerated or heat insulating jackets on the equipment in order to minimize the refrigerating problem and also to prevent the polymer particles from becoming sticky as they are prone to do over a considerable temperature range between the reaction temperature and the flashing temperature.

The vibrating screen 63 can be of a standard type provided that suitable allowances are made for the fact that it is to be operated at temperatures in the vicinity of about −140° F. For example, the screen stabilizers can be of spring construction provided that they are made of Phosphor bronze or nickel steel or other spring metal which can withstand these low temperatures. Also rubber stabilizers may be used by enclosing them in special insulated chambers which are heated to maintain the elasticity of the rubber parts. In order to maintain the screen at a temperature sufficiently low, the screen enclosure can be surrounded by a jacket containing a refrigerant such as ethylene.

A rapid circular motion, the pitch or amplitude of which can be varied from about $\frac{1}{64}''$ to $\frac{3}{8}''$ and the speed of which can be varied between about 400 and 2,000 R. P. M., is imparted to the vibrating screen 63. This type of motion causes the polymer particles to move along the screen. By tilting the screen either upward or downward and at various angles of say ±15°, the time of residence and degree of "wetness" of the solid polymer particles on the screen can be controlled.

The transfer of the cold polymer from the screening zone into the flash tank presents a major mechanical problem. In view of the fact that the polymer particles exhibit undesirable tackiness at higher temperatures up to the boiling temperature of the adhering liquids, it is obvious that temperature of the polymer particles must be kept down around the reaction temperature, not only during the screening operation but it must also be kept at that general level up to a point just prior to the introduction of the polymer into the flashing liquid. The transfer is preferably carried out in such a way as to keep the polymer particles cold until they are inside the flash drum and to keep the particles separated from one another while they are becoming heated up to the flashing liquid temperature. To achieve this, it is necessary that the polymer be prevented from touching warm surfaces until it hits highly agitated water or other flashing liquid. Furthermore, in order to avoid icing it is necessary to prevent water vapor from getting back into the screening chamber and into the pipes carrying the solid polymer.

An especially effective arrangement which has solved this problem is shown in Figure 2. It is noted that this particular arrangement is the joint invention of A. D. Green, one of the inventors herein, Eger V. Murphree and Wendell W. Waterman, and is claimed in copending application Serial No. 502,258, filed September 14, 1943, now Patent 2,395,901.

In this arrangement, the vibrating screen is located above the flash tank 71. The polymer particles fall from the end of the screen into a hopper 72. Suitable vibrating means are connected to the hopper in order to impart vibratory movement thereto to promote steady flow of polymer therethrough. The top of the hopper is located within the screen enclosure proper while the bottom part extends downwardly into the pipe 73 connecting the enclosure and the flash drum. The enclosure 62 as well as the connecting pipe 73 is surrounded by a jacket and liquid ethylene is supplied thereto in order to keep the screen and the separated solid polymer particles in the vibrating hopper cold. Heat insulating material 74 is provided between the pipe 73 and its surrounding jacket and the top of the flash tank in order not to cool the wall of the flash tanks to such an extent as to cause the formation of ice thereon.

The polymer particles dropping from the vibrating hopper 72 fall through the surge chamber 75 into the heated liquid in the flash chamber 71. The wall of surge chamber 75 may be either cylindrical or conical in shape, the principal factor being that it should be large enough in diameter that the polymer particles do not hit the warm sides of the surge chamber but drop directly as individual particles into the hot water below. The walls of the surge chamber 75 are kept at a temperature above the freezing point of water. For this purpose, fins 76 may be provided on the walls of the chamber in order to assist in the heat transfer or, if necessary, electrical or steam heating means may be provided thereon.

The size of the surge chamber is related to the volume of the screen enclosure or chamber so that under normal conditions pressure surges in the flash tank which occur due to uneven vaporization of the volatile liquids will be absorbed in the surge chamber.

In order to keep water vapor from the flash tank from backing up and reaching and icing the cold surfaces, a sealing gas is introduced into the screen enclosure and blows through the vibrating hopper and the transfer pipe concurrently with the polymer. Under ideal conditions, the cold flushing gas would normally fill the surge chamber and the interface between this cold gas and the hot flash gas would be at the bottom of the surge chamber. If there is a sudden temporary increase in gas evolution, the pressure increases in the flash tank and the interface between the hot and cold gases moves up into the surge chamber. The larger the surge chamber in relation to the filter chamber, the less danger there is of getting icing on the cold surfaces, but the greater the flow of flushing gas that is needed to keep the surge chamber full of cold gas.

The sealing gas may be natural gas, hydrogen, methane, nitrogen or other low boiling gas. The amount of flushing or sealing gas needed to prevent serious icing has been found to increase with increasing molecular weight of the gas. This is apparently due to the fact that the lighter the gas, the more stratification is obtained inside the surge chamber and the less tendency for the cold and hot gases to mix therein. In general, it appears to be desirable to have the density of the cold gas less than that of the hot flash gas, which means, of course, that the molecular weight of the cold gas must be very much less than that of the flash gas. In practice, if cold methane is used as the sealing gas in the separation of an isoolefin diolefin copolymer from the cold reaction mixture, the actual gas density will be about the same as that of the flash gas. Use of hydrogen is attractive from the standpoint of decreasing the volume of the gases removed from the flash tank and thereby decreasing the size of the refrigeration and fractionation equipment necessary to recover it from the relatively volatile reactants or diluent such as methyl chloride.

One disadvantage of natural gas is that methane is fairly soluble in the cold reaction liquid at −130° F. This effect can be minimized by providing baffles 77 and 78 in the enclosure near the end of the vibrating screen and adding the natural gas or other relatively soluble sealing gas at 79 and introducing a slightly soluble gas such as nitrogen at 80. A small flow of nitrogen would be used relative to the methane. This nitrogen would mix with methane at the end of the vibrating screen and by sufficient purging of the recycled methane, the molecular weight of the sealing gas could be kept down to about 18 or 20.

The polymer particles, carrying some occluded or adsorbed reaction liquid discharged from the vibrating hopper, fall freely as separated particles through the surge chamber and into a flashing liquid, preferably water, which is maintained at about 100–160° F. Vigorous agitation of the flashing liquid is provided by mixer 81 in order to prevent agglomeration of the polymer and to form a uniform water slurry. In view of the low boiling point of the liquids associated with the polymer, these liquids flash off as soon as, if not before, the polymer strikes the water.

The sealing gases and the gases flashed off from the liquid entrained with the polymer dropped into the flash tank are removed through outlet 82 and passed to a suitable recovery and repurification system.

The recovery and repurification of the flashed gases removed through 82 in general comprises compressing and drying the flashed gases. The resultant mixture is then subjected to fractionation to separate a stream of catalyst solvent which is subjected to careful purification, after which it is used to dissolve additional catalyst, whereupon it may be injected into the reactor. The bottoms from this fractionation is subjected to a further fractionation to remove overhead isoolefin and diluent which can be recycled to the reactor and to separate a bottoms fraction containing the diolefins, polymers, etc. which may, if desired, be subjected to a purification in order to separate the polymers and recover the diolefins for recycling to the reactor. The recovered reactants and diluents are cooled to reaction temperature, after additional isoolefin, diolefin and/or diluent are added to make up consumption and losses in the system, whereupon these materials may be supplied to the reactor.

The polymer is removed from the flash tank through outlet 83 in finely divided form as a slurry in hot water. The polymer may be separated from the slurry in any desired manner, a convenient method comprising simply discharging the slurry onto an endless belt type screen, applying suction and passing the polymer through squeeze rolls in order to remove a maximum amount of water mechanically prior to passing the polymer through a tunnel type or other drier. If so desired, the polymer may be washed and steamed on the screen to remove any residual catalyst or volatile materials therefrom. Alternatively, another vibrating screen could be used to separate the polymer from the water and drop it directly into the drier. After drying, the polymer is ready for use and may be used directly or packaged for storage or shipment after being put into compact form by extruding, milling, pressing, etc.

The amount of liquid adhering to the solid polymer leaving the vibrating screen 63 can vary considerably but it usually is of the order of 1.5 to 2 pounds per pound of solid. If it should be desirable to decrease this liquid content below what can be done on a vibrating screen, the solid can be passed between squeezing rollers still at a low temperature. A suitable arrangement for removing additional liquid by passing the polymer between squeeze rolls after screening is shown in Figure 3. In this figure 212 is the enclosure for the cold vibrating screen 213. Cold slurry is supplied to the screen through line 211 which discharges into a weir box or onto a distributor plate 214 that serves to distribute the slurry across the screen. The cold liquid passes through the screen and is caught in trough 215 and is withdrawn from the screen enclosure through line 216 as in the arrangement shown in Figure 2. The vibrating screen overhangs an endless screen 225 which passes between a pair of press rolls as in a Louisville press. The polymer particles which may be somewhat caked together due to the squeezing operation are broken up in the disintegrator 227 and deposited on a conveyor belt 228 which carries the polymer into the flash tank and drops the polymer particles into the heated water wherein it forms a slurry of finely divided particles. Sealing gas is introduced into the vibrating screen enclosure and, if desired, an auxiliary sealing chamber may be provided by inserting baffles 223 and 224 in the enclosure and supplying further sealing gas thereto in the same manner and for the same purpose as described above in connection with Figure 2. The slurry is withdrawn from the flash tank, dewatered, washed and dried as described above in connection with Figure 2.

The following examples are given as illustrative of the manner in which the process in accordance with our invention may be carried out.

*Example 1*

A tube bundle type of reactor which is externally refrigerated by means of liquid ethylene and having an internal draft tube and agitator is supplied with a feed consisting of one part by volume of a mixture of 98.5 weight percent isobutylene and 1.5 weight percent isoprene, and one part by volume of methyl chloride, precooled to about −135° F. Mixed with this feed is some recycled reaction liquid. When the system becomes cooled, catalyst solution containing 0.4 gram of aluminum chloride per 100 cc. of solution is injected into the draft tube in a series of very fine jets. The catalyst solution is precooled to −135° F., and is sprayed in at a rate such that the heat of reaction from polymer production will not overload the cooling capacity. For example, with 12 sq. ft. of cooling surface and rapid agitation, about 8 lbs. per hour of catalyst solution might be added, making about 10 lbs. per hour of polymer. The reactor runs full, and the reaction mixture is forced out by the pressure of the incoming fresh feed-recycle mixture, and into the feed box of a vibrating screen which is maintained at about −135° F. The screen separates the solid material over a size corresponding to about 40 mesh. The screen runs at a speed of 1500 R. P. M., a throw of 0.208 inch, and an uphill slope of 6.5 degrees. 145 standard cubic feet per hour of hydrogen is supplied as a flushing gas to the screen enclosure, and the polymer drops through a vibrating 3″ lower diameter funnel into a 6 ft. diameter x 15 ft. high flash tank containing water kept at 130° F. by injecting steam beneath its surface, and kept well agitated by a turbo-mixer. A level of water or slurry of about 5 ft. is maintained in the tank. The resulting slurry of rubber in water is pumped to the finishing building. The liquid and some finely divided polymer passing through the screen is returned to a sump, wherein it is mixed with fresh feed, and pumped back into the reactor. In this case the material removed from the reaction system by the screen contains about 33 wt. percent solids, and the composition of the equilibrium reaction mixture will be about 90 wt. percent methyl chloride, 9.5% isobutylene and 0.5% isoprene, neglecting the methyl chloride introduced with the catalyst and the impurities.

A non-vulcanizable polybutene of high molecular weight could be prepared by following the same procedure outlined above but omitting the isoprene.

*Example 2*

A reaction mixture containing isobutylene, dimethylbutadiene, and methyl chloride is passed through a bed of dry ice to saturate the liquid with carbon dioxide. The mixture then passes to an insulated, well-agitated reactor where a solution of 0.3 gram of aluminum bromide in 100 cc. of methyl chloride is sprayed into the liquid. A slurry is formed which is pumped onto a moving belt screen in a chamber fed with hydrogen as a flushing gas. The polymer is held on the screen (about 30 mesh) and is transferred to a flash tank similar to that in Example 1, via a vibrating chute. The liquid passing through the screen collects in a trough, falls into a sump where it is mixed with a fresh feed of isobutylene, 4% by weight of dimethylbutadiene based on the isobutylene and one-half a volume of methyl chloride based on the volume of hydrocarbons present. The resulting mixture is passed through the bed of dry ice back into the reactor. The reaction liquid will have an equilibrium composition of about 55 weight percent methyl chloride, 20 weight percent of dissolved carbon dioxide, 24 weight percent of isobutylene and 1 weight percent of dimethylbutadiene, neglecting the methyl chloride introduced with the catalyst and the impurities.

*Example 3*

A high molecular polybutene was prepared by supplying a continuous reactor with isobutylene of the following composition:

|  | Mol percent |
|---|---|
| Propylene and lighter | 0.01 |
| Propane | 0.05 |
| Isobutane | 1.0 |
| N-butene-2 | 1.2 |
| N-butene-1 | 0.3 |
| $C_5$ and heavier | 0.02 |
| Isobutylene | 97.4 | and ethylene of the following composition:

|  | Mol percent |
|---|---|
| Fixed gases | 0.3 |
| Ethane | 3.7 |
| $C_3$ and heavier | 0.2 |
| Ethylene | 95.8 |

The isobutylene was supplied to the reactor at the rate of 3.9 gals./min. and the ethylene at the rate of 11.6 gals./min., the feed being precooled. The reactor was operated at −150° F., the ethylene being allowed to flash at will. The overflow from the reactor was allowed to run onto a screen which was also maintained at −150° F. When the entire system became cooled, a 0.6 weight percent solution of aluminum chloride in methyl chloride of a high degree of purity (99.8 mol percent methyl chloride) was introduced into the reactor as a finely divided spray at the rate of 80 cc./hr. The polymer was formed as a finely divided slurry which overflowed onto the above-mentioned screen which separated the solid polymer particles. The solid polymer separated corresponded to an 8% yield per pass based upon the isobutylene supplied to the screen.

The polymer discharged from the screen contained 2½ lbs. of liquid per pound and was discharged through a vibrating, funnel-shaped hopper into a heated, well-agitated water in a flash tank concurrently with a stream of nitrogen which was supplied to the hopper at the rate of 1 ft./sec. to prevent backing up of water vapor into the screen. The polymer which was obtained as a relatively fine grained water slurry had an average molecular weight of 80,000–120,000, according to the Staudinger method.

The foregoing description and examples are intended to be illustrative and it is obvious that numerous variations are possible without departing from the purview of this invention as defined in the following claims.

What we claim and desire to secure by Letters Patent is:

1. A polymerization process comprising the steps in combination of preparing a mixture of a polymerizable olefinic material selected from the group consisting of iso-olefins of 4 to 8 carbon atoms and mixtures consisting of at least 50% by weight of such iso-olefins and the remainder being selected from the group consisting of 5 to 50% by weight of diolefin of 4 carbon atoms and 0.5 to 10% of diolefin of 5 to 6 carbon atoms, with a liquid diluent selected from the group consisting of ethylene and methyl chloride which is a non-solvent for the polymer and which is inert with respect to a Friedel-Crafts polymerization catalyst, said liquid serving as diluent for the reaction mixture, in the proportion of from 1 to 9 volumes of diluent per volume of polymerizable material, adding to the above mixture a catalyst solution consisting of 0.1 to 1.0 gram of Friedel-Crafts catalyst per 100 cc. of solution, the catalyst solvent being a liquid which forms no complex with the Friedel-Crafts catalyst and is liquid at the reaction temperature, effecting this polymerization reaction at a temperature between −90° F. and −250° F., using the larger proportion of diluent with the upper polymerization temperatures, and with the upper diolefin concentrations in the polymerization feed, to form a stable polymer slurry having about 10 to 40% by weight of solids, said polymer having an average molecular weight of about 30,000 to 200,000 by the Staudinger method, conveying said slurry to a moving screen maintained substantially at the same reaction temperature, whereby solid polymer wetted with a minor proportion of the slurry liquid is retained on the screen while a major proportion of the slurrying liquid passes through the screen, said screen being in an enclosure kept filled with an inert flushing gas to prevent backflow of moisture from the aqueous flash tank, returning a substantial proportion of the screened slurry liquid while still maintaining its temperature substantially at the reaction temperature directly to the reactor, scraping the solid polymer from the screen and while maintaining its temperature still at substantially reaction temperature, delivering it with entrained slurry liquid to an aqueous flash tank maintained at about 100–160° F. to volatilize out the entrained slurry liquid.

2. A continuous polymerization process comprising the steps in combination of preparing a mixture of 98.5% by weight of isobutylene and 1.5% by weight of isoprene, together with 1 to 2 volumes of methyl chloride per volume of said mixed reactants, cooling the mixture to a temperature of approximately −135° F., being the boiling point of liquid ethylene when modified by the heat gradient through the walls of the reactor, obtained by the application to the mixture of a refrigerating jacket, the polymerization being conducted by the admixture with the olefinic material and diluent of a catalyst comprising aluminum chloride in a solution in methyl chloride, the catalyst concentration being 0.1 to 1.0 gm. per 100 cc., continuously agitating the reaction mixture to a Reynolds turbulence number of over 5000, to produce a stable polymer slurry having about 10 to 40% by weight of solids, said polymer having an average molecular weight of about 30,000 to 200,000 by the Staudinger method, conveying said slurry to a moving screen maintained substantially at the same reaction temperature of about −135° F., whereby solid polymer having entrained therewith a minor proportion of the slurry liquid is retained on the screen while a major proportion of the slurry liquid passes through the screen, said screen being in an enclosure kept filled with an inert flushing gas to prevent backflow of moisture from the aqueous flash tank, returning a substantial proportion of the screened slurry liquid while still maintaining its temperature substantially at −135° F. directly to the polymerization reactor, removing the solid polymer from the screen and while maintaining its temperature still at substantially −135° F. delivering it with entrained slurry liquid to an aqueous flash tank maintained at about 100 to 160° F. to volatilize out the entrained slurry liquid.

ARTHUR D. GREEN.
WALTER J. PALTZ.

REFERENCES CITED

The following references are of record in the file of this patent:

UNITED STATES PATENTS

| Number | Name | Date |
|---|---|---|
| 2,317,878 | Bannon | Apr. 27, 1943 |
| 2,325,984 | Sarbach | Aug. 3, 1943 |
| 2,378,138 | Gaylor | June 12, 1945 |
| 2,384,298 | Green | Sept. 4, 1945 |

OTHER REFERENCES

Murphy: National Petroleum News, Feb. 18, 1942, pages R51 to R55 and R57.